US010696552B2

(12) United States Patent
Hu et al.

(10) Patent No.: US 10,696,552 B2
(45) Date of Patent: Jun. 30, 2020

(54) METHOD FOR PRODUCING WET-PROCESS PHOSPHORIC ACID AND BY-PRODUCING ALPHA-HEMIHYDRATE GYPSUM AND HIGH-PURITY AND HIGH-WHITENESS ALPHA-HEMIHYDRATE GYPSUM

(71) Applicant: KINGENTA NORSTERRA CHEMICAL CO., LTD., Guizhou (CN)

(72) Inventors: Zhaoping Hu, Shandong (CN); Hualong Yao, Shandong (CN); Hongkun Chen, Shandong (CN); Shihua Pang, Shandong (CN); Yongxiu Liu, Shandong (CN); Chengzhi Li, Shandong (CN)

(73) Assignee: Kingenta Norsterra Chemical Co., Ltd., Guizhou (CN)

( * ) Notice: Subject to any disclaimer, the term of this patent is extended or adjusted under 35 U.S.C. 154(b) by 270 days.

(21) Appl. No.: 15/760,822

(22) PCT Filed: Aug. 26, 2016

(86) PCT No.: PCT/CN2016/096923
§ 371 (c)(1),
(2) Date: Mar. 16, 2018

(87) PCT Pub. No.: WO2017/045519
PCT Pub. Date: Mar. 23, 2017

(65) Prior Publication Data
US 2018/0273384 A1    Sep. 27, 2018

(30) Foreign Application Priority Data
Sep. 18, 2015 (CN) .......................... 2015 1 0595122

(51) Int. Cl.
*C01B 25/231* (2006.01)
*C01F 11/46* (2006.01)

(52) U.S. Cl.
CPC ............ *C01B 25/231* (2013.01); *C01F 11/46* (2013.01)

(58) Field of Classification Search
CPC ....... C01B 25/231; C01B 25/321; C01F 11/46
See application file for complete search history.

(56) References Cited

U.S. PATENT DOCUMENTS 3,935,298 A   1/1976  Sugahara et al.
4,196,172 A   4/1980  Ore et al.
(Continued)

FOREIGN PATENT DOCUMENTS

CN   1247158 A   3/2000
CN   1421385 A   6/2003
(Continued)

OTHER PUBLICATIONS

Extended European Search Report for European Application No. 16 845 634.1, dated Feb. 22, 2019, 7 pages.
(Continued)

*Primary Examiner* — Anthony J Zimmer
(74) *Attorney, Agent, or Firm* — RatnerPrestia

(57) ABSTRACT

Provided is a method for producing wet-process phosphoric acid and at the same time obtaining alpha-hemihydrate gypsum as well as high-purity and high-whiteness alpha-hemihydrate gypsum, including: mixing phosphoric acid and phosphate rock powder and performing extraction reaction; adding sulfuric acid solution to continue the reaction so that 30% to 50% of calcium ions are generated into dihydrate gypsum; transferring the dihydrate gypsum to a crystal transformation tank; adding a crystal transformation agent and controlling the crystal transformation conditions to
(Continued)

obtain 30% to 50% of normal hemihydrate gypsum; after separation, introducing phosphoric acid extraction solution containing other 30% to 50% of calcium ions in a form of calcium dihydrogen phosphate into decalcification reaction tank; adding sulfuric acid solution diluted by washing liquid and performing decalcification reaction; controlling the crystal transformation conditions and performing crystal transformation reaction to convert the solid into high-purity and high-whiteness alpha-hemihydrate gypsum.

15 Claims, 2 Drawing Sheets

(56) References Cited

U.S. PATENT DOCUMENTS

| | | | |
|---|---|---|---|
| 4,501,724 A | | 2/1985 | Goers |
| 4,777,027 A | * | 10/1988 | Davister ............... C01B 25/222 423/157.4 |
| 4,797,265 A | | 1/1989 | Inoue et al. |
| 2004/0047790 A1 | | 3/2004 | Feng et al. |
| 2007/0048549 A1 | | 3/2007 | Song et al. |

FOREIGN PATENT DOCUMENTS

| | | |
|---|---|---|
| CN | 1584130 A | 2/2005 |
| CN | 1789116 A | 6/2006 |
| CN | 102001636 A | 4/2011 |
| CN | 102126737 A | 7/2011 |
| CN | 102303852 A | 1/2012 |
| CN | 103086335 A | 5/2013 |
| CN | 103332664 A | 10/2013 |
| CN | 103626143 A | 3/2014 |
| CN | 104211105 A | 12/2014 |
| CN | 104355560 A | 2/2015 |
| CN | 104628274 A | 5/2015 |
| KZ | 26378 A4 | 11/2012 |

OTHER PUBLICATIONS

Canadian Office Action for Canadian Application No. 2,998,908, dated Mar. 11, 2019, 5 pages.
Ru, et al., "Research progress of a-hemihydrate gypsum prepared by phosphogypsum," Nov. 2011, pp. 15-18, New Building Materials (abstract only).
Chinese Office Action for Chinese Application No. 201510595122. 4, dated Nov. 4, 2016, with English translation, 9 pages.
International Search Report issued in PCT/CN2016/096923 dated Nov. 30, 2016, 6 pages.
Russian Office Action for Russian Application No. 2018113281/05, dated Dec. 19, 2018, with translation, 11 pages.
Russian Office Action for Russian Application No. 2018113282/05, dated Dec. 27, 2018 with trasnslation, 14 pages.
USPTO Non-Final Office Action issued in U.S. Appl. No. 15/760,851, dated Aug. 9, 2019, 25 pages.
Supplementary European Search Report issued in EP 16 84 5633 dated Feb. 22, 2019, 7 pages.
USPTO Final Office Action issued in U.S. Appl. No. 15/760,851 dated Feb. 4, 2020, 6 pages.

* cited by examiner

METHOD FOR PRODUCING WET-PROCESS PHOSPHORIC ACID AND BY-PRODUCING ALPHA-HEMIHYDRATE GYPSUM AND HIGH-PURITY AND HIGH-WHITENESS ALPHA-HEMIHYDRATE GYPSUM

CROSS REFERENCE TO RELATED APPLICATIONS

This application is the U.S. National Phase Application of PCT/CN2016/096923, filed Aug. 26, 2016, which claims priority to Chinese Patent Application No. 201510595122.4, filed on Sep. 18, 2015, the disclosures of which are hereby incorporated by reference in their entirety.

FIELD

The present invention relates to the field of a method for producing wet-process phosphoric acid, specifically to a method for producing wet-process phosphoric acid and at the same time obtaining alpha-hemihydrate gypsum as well as high-purity and high-whiteness alpha-hemihydrate gypsum as by-products.

BACKGROUND

In the process of conventional wet-process phosphoric acid production, sulfuric acid reacts with phosphate rock to generate phosphoric acid and phosphogypsum. Phosphorus content in by-product phosphogypsum is generally more than 1.0%. The use of phosphogypsum with a phosphorus content of more than 0.5% is usually limited when it is used as chemical raw material or construction material. In many factories, phosphogypsum has been piled up like mountains and becomes a public hazard. Phosphogypsum has become a technical problem and a restrictive factor for the sustainable development of the phosphorus chemical industry.

At present, there are many researches on improving the technical process and optimizing the by-products, such as phosphogypsum, of the conventional wet-process phosphoric acid including the following patents.

Chinese patent CN103626143A (Application No.: 201310620402.7) discloses a method for preparing white gypsum, a by-product of wet-process phosphoric acid production. Firstly, phosphate rock powder (slurry) and phosphoric acid with a phosphorus pentoxide content (w %) of 16 to 32 react for 15 min to 60 min under stirring at a temperature range of 45 to 70° C. to generate a mixed slurry that contains solid impurities. The mixed slurry is subjected to continuous or discontinuous precipitation for 1.0 to 3.5 h, layered and separated, giving a thick slurry containing a mixed solution of phosphoric acid and calcium phosphate, as well as solid impurities. Under condition of stirring, sulfuric acid (40 to 98 (w %)) is added to the mixed solution of phosphoric acid and calcium phosphate and reacted for 10 min to 40 min. The resulting mixture is precipitated, layered and separated into phosphoric acid and white gypsum. By this method, phosphoric acid and white gypsum are obtained without the generation of phosphogypsum, eliminating the pollution from the piled phosphogypsum to air, soil and underground water. In addition, the by-product dihydrate white gypsum has high purity and high whiteness value. However, there are still acid-insoluble residues generated by this method, which is difficult to deal with. In addition, the dihydrate white gypsum needs to be subjected to dehydrate process or crystal modification process to obtain beta-gypsum or alpha-gypsum products with high added value.

Chinese patent CN102001636A (Application No.: 201010291898.4) discloses a method for preparing phosphoric acid with a wide-range concentration and clean gypsum through wet-process from low or medium grade phosphate rock. The method provides a new method for preparing wet-process phosphoric acid—hemi-dihydrate method, of which the by-product is high quality construction hemihydrate gypsum or functional dihydrate gypsum, making full use of low or medium grade phosphate rock. However, the method still discharges solid residues and dihydrate gypsum at a similar amount of the clean gypsum, which is hard to be used.

Chinese patent CN1421385A (Application No.: 02128116.5) discloses a method for preparing hemihydrate-dihydrate phosphoric acid. In the method, the precipitation rate of calcium in reaction tank is controlled and sulfuric acid is added at two steps. One part of sulfuric acid is added to acid-mixing tank, mixed with diluted phosphoric acid and then added to the second reaction tank; the other part of sulfuric acid is added to diluted phosphoric acid tank, and the concentration of sulfate ion in the diluted phosphoric acid is controlled to be from 8% to 10% $SO_4^{2-}$. Alpha-hemihydrate gypsum is prepared firstly and then transformed to dihydrate gypsum. By-product of the method is still dihydrate gypsum, which is hard to be used directly.

Chinese patent CN103086335A (Application No.: 201310044529) discloses a dihydrate-hemihydrate method for producing wet-process phosphoric acid and at the same time obtaining by-product alpha-hemihydrate gypsum. The parameters for dihydrate process are: temperature of reaction tank is from 70° C. to 80° C., the duration is from 1.5 h to 3 h, the concentration of free sulfate ion is from 1% to 2%, and $\omega(P_2O_5)$ concentration of the wet-process phosphoric acid is from 35% to 39%. Parameters for hemihydrate process are: temperature of reaction tank is from 86° C. to 94° C., the duration is from 1 h to 2 h, the concentration of free sulfate ion is from 6% to 8%. $\omega(P_2O_5)$ concentration of the phosphoric acid prepared by hemihydrate process is from 10% to 15%, as an acid supplemental production of dihydrate process. The by-product, hemihydrate phosphogypsum, contains 5% to 7% crystal water, in which the mass percentage of free $P_2O_5$ is less than 0.4%, and the crystal form of which is alpha-hemihydrate phosphogypsum. In the method, the condition for dihydrate-hemihydrate crystal transformation is not strictly controlled, and no crystal transformation agent is used to control the aspect ratio of alpha-hemihydrate gypsum. Although alpha-hemihydrate gypsum product is produced, the strength of alpha-hemihydrate gypsum product is low, so the use of the product is limited. In addition, phosphorus content of the product is still relative high.

Hemihydrate gypsum ($CaSO_4 \cdot \frac{1}{2}H_2O$) powder is a kind of cementitious material. According to the content of impurity, color and external appearance, most of general alpha-hemihydrate gypsum is used to produce new type construction materials, such as cement flocculant and so on. Some gypsum products need to be made from high-purity, high-whiteness and high-quality alpha-hemihydrate gypsum, such as fiber gypsum board, gypsum plasterboard, gypsum suspended ceiling board, gypsum block, gypsum relief and lines and caulking, which are widely used in renovation and decoration. Therefore, an industrial large-scale production method that not only produces normal alpha-hemihydrate gypsum but also high-purity, high-whiteness and high-quality alpha-hemihydrate gypsum is an urgent demand of industrial production and market.

After search, no patent and report that provide industrial large-scale production method for preparing wet-process phosphoric acid and various kinds of high-quality gypsum at the same time is found.

SUMMARY

In order to solve the problem in the prior art that high phosphorus content in the by-product phosphogypsum of the wet-process phosphoric acid, which leads to low use value of phosphogypsum, and the problem that none of the method in the prior art can coproduce various kinds of gypsum concurrently, the present disclosure provides a method for producing wet-process phosphoric acid by-products: normal alpha-hemihydrate gypsum, high-purity and high-whiteness alpha-hemihydrate gypsum, beta-hemihydrate gypsum and dihydrate gypsum. The present disclosure not only reduces phosphorus content in by-products such as alpha-hemihydrate gypsum and other gypsum, reducing phosphorus content to less than 0.1%, but also realizes industrial large-scale production for wet-process phosphoric acid and the by-products normal alpha-hemihydrate gypsum as well as high-purity and high-whiteness alpha-hemihydrate gypsum, fulfilling different requirements of industrial production and market.

The technical solutions of the present disclosure are described as follows.

A method for producing wet-process phosphoric acid and at the same time obtaining alpha-hemihydrate gypsum as well as high-purity and high-whiteness alpha-hemihydrate gypsum as by-products, comprising the following steps:

(1) mixing phosphoric acid and phosphate rock powder, performing an extraction reaction under stirring; after completion of the extraction reaction, adding sulfuric acid solution, continuing the reaction under stirring to obtain an extraction slurry; separating solid and liquid of the extraction slurry to obtain a phosphoric acid extraction solution A and a slag slurry B; wherein the amount of the sulfuric acid solution added is controlled, so that 10% to 50% of calcium ions are transformed into dihydrate gypsum and the other 50% to 90% of calcium ions exist in a form of calcium dihydrogen phosphate;

(2) mixing the phosphoric acid extraction solution A obtained in step (1) and the sulfuric acid solution, performing a decalcification reaction; after completion of the reaction, separating solid and liquid to obtain a solid C and a filtrate D;

(3) performing a crystal transformation reaction with the solid C obtained in step (2), part of the filtrate D obtained in step (2), a sulfuric acid solution and a crystal transformation agent; after completion of the reaction, separating solid and liquid to obtain a high-purity and high-whiteness alpha-hemihydrate gypsum as well as a filtrate F;

(4) performing crystal transformation reaction with the slag slurry B obtained in step (1), part of the filtrate D obtained in step (2), a sulfuric acid solution and a crystal transformation agent; after completion of the reaction, separating solid and liquid to obtain an alpha-hemihydrate gypsum and a filtrate J.

Preferably, the present disclosure comprises the following steps:

(1) mixing phosphoric acid and phosphate rock powder, performing an extraction reaction under stirring; after completion of the extraction reaction, adding sulfuric acid solution, continuing the reaction under stirring to obtain an extraction slurry; separating solid and liquid of the extraction slurry to obtain a phosphoric acid extraction solution A and a slag slurry B; wherein the amount of the sulfuric acid solution added is controlled, so that 30% to 50% of calcium ions are transformed into dihydrate gypsum and the other 50% to 70% of calcium ions exist in a form of calcium dihydrogen phosphate;

(2) mixing the phosphoric acid extraction solution A obtained in step (1) and the sulfuric acid solution, performing a decalcification reaction; after completion of the reaction, separating solid and liquid to obtain a solid C and a filtrate D;

(3) performing a crystal transformation reaction with the solid C obtained in step (2), part of the filtrate D obtained in step (2), a sulfuric acid solution and a crystal transformation agent; after completion of the reaction, separating solid and liquid to obtain a high-purity and high-whiteness alpha-hemihydrate gypsum as well as a filtrate F;

(4) performing crystal transformation reaction with the slag slurry B obtained in step (1), part of the filtrate D obtained in step (2), a sulfuric acid solution and a crystal transformation agent; after completion of the reaction, separating solid and liquid to obtain an alpha-hemihydrate gypsum and a filtrate J.

Preferably, the present disclosure comprises the following steps:

(1) mixing phosphoric acid and phosphate rock powder, performing an extraction reaction under stirring; after completion of the extraction reaction, adding sulfuric acid solution, wherein the amount of the sulfuric acid solution added is controlled, so that 30% to 50% of calcium ions are transformed into dihydrate gypsum and the other 50% to 70% of calcium ions exist in a form of calcium dihydrogen phosphate; continuing the reaction under stirring to obtain an extraction slurry; separating solid and liquid of the extraction slurry to obtain a phosphoric acid extraction solution A and a slag slurry B;

(2) mixing the phosphoric acid extraction solution A obtained in step (1) and the sulfuric acid solution, performing a decalcification reaction; after completion of the reaction, separating solid and liquid to obtain a solid C and a filtrate D; dividing the filtrate D into four parts, which are used for the extraction reaction of step (1), the crystal transformation reaction of step (3), the crystal transformation reaction of step (4), and used as phosphoric acid final product, respectively;

(3) performing crystal transformation reaction with the solid C, the filtrate D obtained in step (2), a sulfuric acid solution and a crystal transformation agent; after completion of the reaction, separating solid and liquid to obtain a solid E and a filtrate F; mixing the obtained filtrate F and the solid C and performing a circular crystal transformation reaction; washing the solid E with 80 to 100° C. hot water to obtain a solid G and a washing liquid H; using the washing liquid H to dilute concentrated sulfuric acid to provide the sulfuric acid solution; drying the solid G to obtain a high-purity and high-whiteness alpha-hemihydrate gypsum;

(4) performing crystal transformation reaction with the slag slurry B obtained in step (1), the filtrate D, a sulfuric acid solution and a crystal transformation agent; after completion of the reaction, separating solid and liquid to obtain a solid I and a filtrate J; dividing the filtrate J into two parts, which is used for the extraction reaction of step (1) and mixing with the slag slurry B for circular crystal transformation reaction, respectively; washing the solid I with 80 to 100° C. hot water to obtain a solid K and a washing liquid L which is used to dilute concentrated sulfuric acid to provide the sulfuric acid solution; drying the solid K to obtain an alpha-hemihydrate gypsum.

Preferably, in step (1), the fineness of the phosphate rock powder is from 80 to 100 meshes; the concentration of phosphoric acid counted by $H_3PO_4$ is from 20 to 35 wt %; and the solid-liquid mass ratio of the phosphate rock powder to the phosphoric acid is from 1:15 to 1:45.

Preferably, in step (1), the reaction temperatures for the extraction reaction and the reaction after the addition of sulfuric acid solution are both from 50 to 80° C.; the extraction duration is from 1.5 to 4.5 h; after adding sulfuric acid solution, reaction is continued under stirring for 1 to 2 h.

Preferably, the concentration of all the above sulfuric acid solution is from 20 to 40 wt %.

Preferably, in step (1), the concentration of phosphoric acid in the phosphoric acid extraction solution A is from 2 to 3 mol/L and the concentration of calcium ion is from 0.5 to 1.0 mol/L.

Preferably, in step (1), the extraction reaction and the reaction after the adding of sulfuric acid are carried out in an extraction tank.

Preferably, in step (2), the temperature for decalcification reaction is from 60 to 130° C. and the reaction duration is from 1.5 to 7.5 h.

Preferably, in step (2), the volume ratio of the sulfuric acid solution to the phosphoric acid extraction solution A is from 1:3 to 1:5

Preferably, in step (2), decalcification reaction is carried out in decalcification tank.

Preferably, in both step (3) and step (4), the liquid-solid mass ratio of crystal transformation reaction is (2 to 6):1; preferably, mixed acid comprising sulfuric acid and phosphoric acid is included in the crystal transformation system, wherein the mass percentage of sulfuric acid counted by $H_2SO_4$ in the mixed acid is from 8 to 12% and the mass percentage of phosphoric acid counted by $P_2O_5$ in the mixed acid is from 16 to 25%.

Preferably, in both step (3) and step (4), the temperature for the crystal transformation reaction is from 60 to 130° C. and the duration of the crystal transformation reaction is from 1.5 to 7.5 h.

Preferably, in step (3) and step (4), the crystal transformation agent is selected from cation-containing water-soluble phosphate, cation-containing sulfate, cation-containing nitrate, cation-containing citrate, cation-containing alkylbenzenesulfonate, cation-containing alkyl fatty acid salt or a mixture thereof, wherein the cation is selected from $Al^{3+}$, $Fe^{3+}$, $Mg^{2+}$, $K^+$, $Na^+$ and $NH_4^+$, or a mixture thereof.

Preferably, in step (3) and (4), the adding amount of crystal transformation agent is 0.1 to 1.0% of the mass of the crystal transformation system.

Preferably, the crystal transformation reaction in step (3) and step (4) is carried out in crystal transformation tank.

Preferably, the hot vapor generated during the dilution of concentrated sulfuric acid with washing liquid H and L is introduced into the crystal transformation reaction system to maintain the temperature and heat needed in crystal transformation.

Preferably, the solid G obtained in step (3) is placed naturally in the air and water is absorbed to give a high-purity and high-whiteness dihydrate gypsum.

Preferably, the solid G obtained in step (3) is placed naturally in the air and water is absorbed; calcination process is performed to give high-purity and high-whiteness beta-hemihydrate gypsum.

Preferably, the temperature for calcination process is from 140 to 180° C.

Preferably, the high-purity and high-whiteness alpha-hemihydrate gypsum, high-purity and high-whiteness dihydrate gypsum as well as high-purity and high-whiteness beta-hemihydrate gypsum obtained in the present disclosure can be grinded into particles with different granularity grades according to the application demand of products.

According to the present disclosure, in extraction reaction of step (1), phosphate rock powder is decomposed into calcium dihydrogen phosphate by phosphoric acid, and the calcium dihydrogen phosphate obtained dissolves in the phosphoric acid. A certain amount of sulfuric acid solution is added so that the calcium dihydrogen phosphate and sulfuric ion react with each other in the liquid phase to give dihydrate gypsum. In the present application, by controlling the adding amount of the sulfuric acid, 30% to 50% of calcium ions in the reaction system are generated into dihydrate gypsum whisker, which is further transformed into normal alpha-hemihydrate gypsum by crystal transformation reaction; the 50% to 70% of calcium ions, which exist in calcium dihydrogen phosphate, react with sulfuric acid to remove the calcium; after crystal transformation reaction, high-purity, high-whiteness and high-quality alpha-hemihydrate gypsum is obtained.

In the present disclosure, the key for preparing high-strength alpha-hemihydrate gypsum is choosing suitable solution system to regulate the different phases of gypsum proportionally. The crystal transformation agent of the present disclosure is selected from cation-containing water-soluble phosphate, cation-containing sulfate, cation-containing nitrate, cation-containing citrate, cation-containing alkyl benzene sulfonate and cation-containing alkyl fatty acid salt, or a mixture thereof, wherein the cation is selected from $Al^{3+}$, $Fe^{3+}$, $Mg^{2+}$, $K^+$, $Na^+$ and $NH_4^+$, or a mixture thereof. Those cation-containing crystal transformation agents are favorable for the generation and stability of short cylindrical alpha-hemihydrate gypsum under the condition of mixed sulfuric acid and phosphoric acid.

The normal alpha-hemihydrate gypsum as well as high-purity, high-whiteness and high-quality alpha-hemihydrate gypsum prepared by the present disclosure not only can be dried and made into gypsum powder, but also can be made into gypsum products, such as gypsum board, gypsum block, gypsum component and so on, by adding water directly without drying.

In the present disclosure, washing liquid is used to dilute the concentrated sulfuric acid. On one hand, washing liquid recycling avoids the generation of waste liquid; on the other hand, vapor generated by the heat of dilution from the concentrated sulfuric acid is transferred to the crystal transformation system to maintain the temperature and heat needed by the crystal transformation reaction, realizing the recycling and reuse of the dilution heat. According to the actual production, a production line, which has an annual production of 30,000 tons of normal alpha-hemihydrate gypsum and 70,000 tons of high-purity and high-whiteness alpha-hemihydrate, will save about 700,000 Yuan by using the dilution heat from concentrated sulfuric acid.

The advantages and beneficial effects of the present disclosure are as follows:

1. The present disclosure realizes the graded utilization of calcium source, which produces 30% to 50% of normal alpha-hemihydrate gypsum, and 50% to 70% of high-purity, high-whiteness and high-quality alpha-hemihydrate gypsum at the same time.

2. Low grade and medium grade phosphate rocks can be used in the present disclosure, so that the phosphorus sources and calcium source of the phosphate rocks can be efficiently used, so that the cost of production is reduced, the phosphorus utilization rate of phosphate rock is increased, and the phosphorus content in the two kinds of alpha-hemihydrate gypsum is below 0.1%.

3. Morphology of the alpha-hemihydrate gypsum prepared in the present disclosure can be controlled. By regulating the formulation of crystal transformation agent, alpha-hemihydrate gypsum with different aspect ratios can be prepared, meeting different requirements on the market.

4. The process of the present disclosure is highly applicable, suitable for industrial large-scale production or the modification of conventional phosphoric acid production technology, meeting different industrial production demands and requirements on the market.

5. No waste residue and waste water are generated in the whole production process, which solves the problem of phosphogypsum discharge in phosphoric chemical industry and has a good ecological benefit and economic effect.

DETAILED DESCRIPTION

Figure 1:
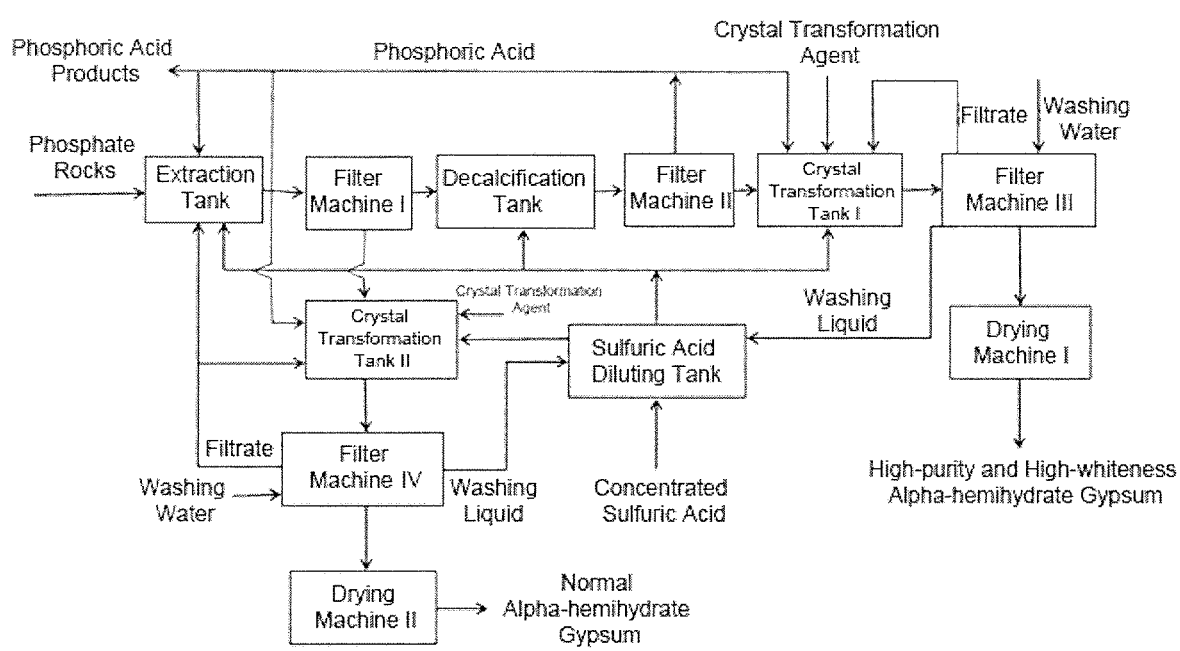
FIG. 1 is the schematic of technical flow chart for producing wet-process phosphoric acid and at the same time obtaining its by-products, alpha-hemihydrate gypsum as well as high-purity and high-whiteness alpha-hemihydrate gypsum in examples 1 to 5 of the present disclosure.
Figure 2:
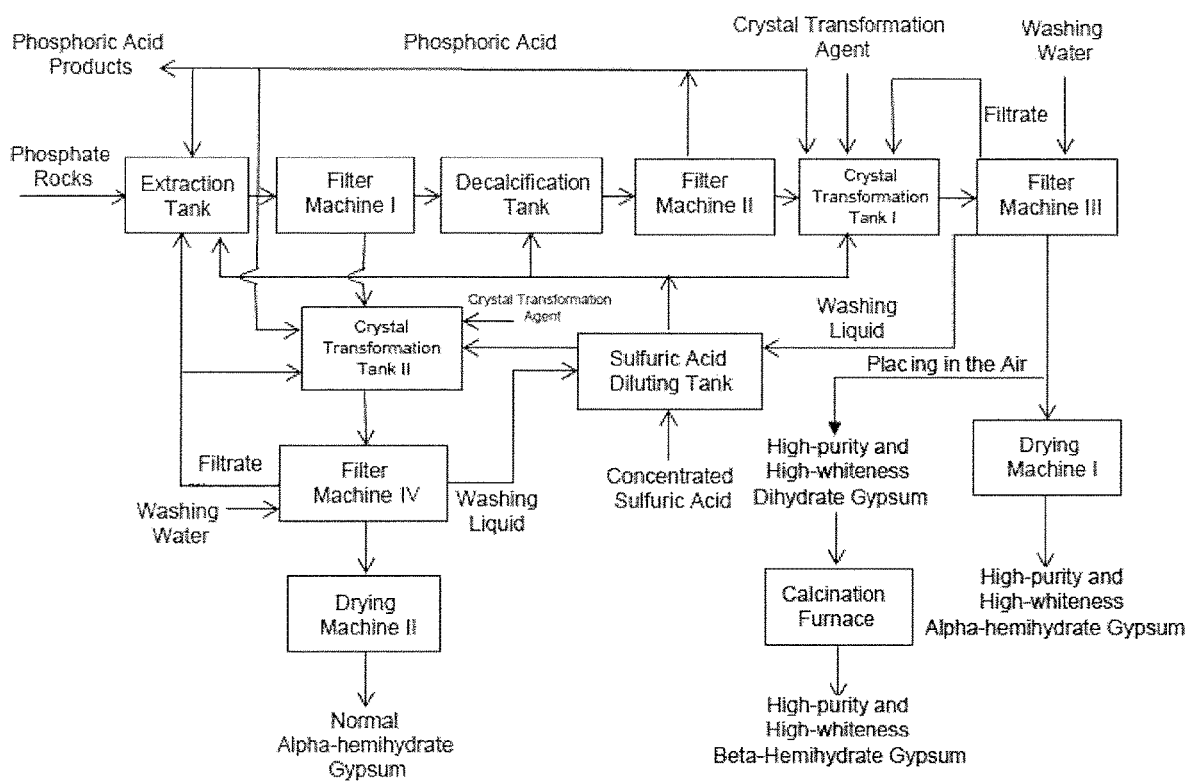
FIG. 2 is the schematic of technical flow chart for producing wet-process phosphoric acid and at the same time obtaining its by-products, alpha-hemihydrate gypsum, high-purity and high-whiteness alpha-hemihydrate gypsum, beta-hemihydrate gypsum and dihydrate gypsum in examples 6 to 7 of the present disclosure.

In order to understand the present disclosure better, the preferred embodiments of the present disclosure are described hereinafter in conjunction with the examples of the present disclosure. It is to be understood that the description is merely illustrating the characters and advantages of the present disclosure, and is not intended to limit the claims of the present application.

All of the chemical agents used in the examples of the present disclosure are commercially available.

Example 1

Raw material 1: phosphate rock, collection site: Guizhou Province;
Raw material 2: sodium citrate, commercially available;
Raw material 3: aluminum sulfate, commercially available;
Raw material 4: sodium dodecyl sulfonate, commercially available;
Raw material 5: sulfuric acid, concentration 97 wt %, commercially available.

All of the sulfuric acid solutions used in the example were obtained by diluting the concentrated sulfuric acid of 97 wt % in sulfuric acid diluting tank.

A method for producing by-products of wet-process phosphoric acid, alpha-hemihydrate gypsum as well as high-purity and high-whiteness alpha-hemihydrate gypsum as by-products, comprising the following steps:

(1) Phosphate rock powder and excess amount of phosphoric acid were added to the extraction tank, wherein the solid-liquid mass ratio of the phosphate rock powder to the phosphoric acid was 1:18 and the concentration of phosphate acid was 25 wt %. The extraction reaction was carried out under the condition of continuous stirring. After the completion of the extraction, sulfuric acid solution with a concentration of 30 wt % was added. The addition amount of sulfuric acid was controlled and the reaction was carried out continuously to obtain an extraction slurry. About 30% of the calcium ions were transformed into dihydrate gypsum and the other 70% of calcium ions existed in the extraction slurry in a form of calcium dihydrogen phosphate. Thereafter, solid and liquid phases of the extraction slurry were separated by passing the extraction slurry through a filter to obtain a phosphoric acid extraction solution A and a slag slurry B. Therein, phosphoric acid in the phosphoric acid extraction solution was 2.5 mol/L and the calcium ion concentration was 0.6 mol/L.

(2) The phosphate acid extraction solution A obtained in the step (1) was introduced into the decalcification reaction tank. Sulfuric acid solution with a concentration of 30 wt %, which was diluted with phosphoric acid of 25 wt %, was added to the decalcification reaction tank. The temperature was maintained at 85° C. and the reaction was carried out for 2 h with stirring. The resulting gypsum whiskers suspended in the phosphoric acid. Solid and liquid of the gypsum whisker suspension was separated by filter to obtain a solid C and a filtrate D. The filtrate D was divided into four parts: one part was introduced into the crystal transformation tank I for crystal transformation reaction, another part was introduced into the crystal transformation tank II for crystal transformation reaction, another part was introduced into the extraction tank for phosphoric rock extraction and the other part was transferred to acid pool as the phosphoric acid product.

(3) The solid C was transferred to the crystal transformation tank I, part of the filtrate D and part of the sulfuric acid solution in the sulfuric acid diluting tank were added, and the liquid-solid mass ratio in the crystal transformation tank I was controlled to be 2:1. The crystal transformation tank I contained a mixed acid comprising sulfuric acid and phosphoric acid, wherein the mass percentage of sulfuric acid counted by $H_2SO_4$ was 10% of the mixed acid and the mass percentage of phosphoric acid counted by $P_2O_5$ was 20% of the mixed acid. According to mass percentage of the crystal transformation system, the following crystal transformation agents were added: sodium citrate 0.12%, sodium dodecyl sulfonate 0.02% and aluminum sulfate 0.25%. Crystal transformation reaction was carried out for 2 h at a temperature maintained at 100° C. After the completion of the reaction, the solid and the liquid were separated by filter to obtain a solid E and a filtrate F. The obtained filtrate F was introduced into the crystal transformation tank I and subjected to crystal transformation reaction continuously. The solid E obtained was washed by 80 to 100° C. hot water to obtain a solid G and a washing liquid H. The solid G not only can be made into high-purity and high-whiteness alpha-hemihydrate gypsum after drying, but also can be made into high-quality gypsum products, such as gypsum board, gypsum block, gypsum components and so on, by adding water directly without drying. The washing liquid H was introduced into the sulfuric acid diluting tank to dilute concentrated sulfuric acid. One part of the diluted sulfuric acid solution was introduced into the extraction tank for continuing the extraction of phosphate rock, another part was introduced into the decalcification reaction tank for continuing the decalcification reaction, another part was introduced into the crystal transformation tank I for crystal transformation reaction, and the other part was introduced into the crystal transformation tank II for crystal transformation reaction. The vapor generated during dilution process provided heat for the crystal transformation tank I and the crystal transformation tank II.

(4) The slag slurry B obtained in the step (1) was transferred to the crystal transformation tank II, and part of the filtrate D, part of the filtrate J and part of the sulfuric acid solution in the sulfuric acid diluting tank were introduced. The liquid-solid mass ratio in the crystal transformation tank II was controlled to be 2:1. The crystal transformation tank II contained a mixed acid comprising sulfuric acid and phosphoric acid, wherein the mass percentage of sulfuric acid counted by $H_2SO_4$ was 9% of the mixed acid and the mass percentage of phosphoric acid counted by $P_2O_5$ was 21% of the mixed acid. According to mass percentage of the crystal transformation system, the following crystal transformation agents were added: sodium citrate 0.15%, sodium dodecyl sulfonate 0.03% and aluminum sulfate 0.37%. Crystal transformation reaction was carried out for 2 h at a temperature maintained at 100° C. After the reaction, the solid and the liquid were separated by belt filter to obtain a solid I and a filtrate J. One part of the filtrate J was introduced into the extraction tank for continuing extraction of the phosphate rock powder, and another part was introduced into the crystal transformation tank II for continuing the crystal transformation reaction. The solid I was washed with hot water to obtain a solid K and a washing liquid L. The solid K not only can be made into normal alpha-hemihydrate gypsum after drying by a drying machine, but also can be made into gypsum products, such as gypsum board, gypsum block, gypsum components and so on, by adding water directly without drying process. The washing liquid L was introduced into the sulfuric acid diluting tank for diluting the concentrated sulfuric acid.

Implementation Results:

Quimociac gravimetric method was used to test the phosphoric acid liquid product and the concentration was 20% wt; $P_2O_5$ content of the normal alpha-hemihydrate gypsum product was 0.06% wt; $P_2O_5$ content of the high-purity and high-whiteness alpha-hemihydrate gypsum product was 0.07% wt.

The normal alpha-hemihydrate gypsum products conformed to the industrial standard JC/T 2038-2010. Under optical microscope of 200× magnification, the alpha-hemihydrate gypsum showed a short cylindrical shape, with an aspect ratio of 1 to 2. The alpha-hemihydrate gypsum showed a 2 h bending strength of 8.0 MPa, a dry bending strength of 15 MPa, a dry compressive strength of 93 MPa, an initial setting time of 9 min and a final setting time of 18 min. The mass percentage of the alpha-hemihydrate gypsum was 87%.

The high-purity and high-whiteness alpha-hemihydrate gypsum products conformed to the industrial standard JC/T 2038-2010. Under optical microscope of 200× magnification, the alpha-hemihydrate gypsum showed a short hexagonal cylindrical shape, with an aspect ratio of 1 to 2. The high-purity and high-whiteness alpha-hemihydrate gypsum showed a 2 h bending strength of 9.0 MPa, a dry bending strength of 16 MPa, a dry compressive strength of 90 MPa, an initial setting time of 8 min and a final setting time of 17 min, a whiteness value of 95.6. The mass percentage of the alpha-hemihydrate gypsum was 99.98%.

Example 2

Raw material 1: phosphate rock, collection site: Guizhou Province;
Raw material 2: sodium citrate, commercially available;
Raw material 3: ferric sulfate, commercially available;
Raw material 4: sulfuric acid, concentration 97 wt %, commercially available.

All of the sulfuric acid solutions used in the example were obtained by diluting the concentrated sulfuric acid of 97 wt % in sulfuric acid diluting tank.

A method for producing by-products of wet-process phosphoric acid, alpha-hemihydrate gypsum as well as high-purity and high-whiteness alpha-hemihydrate gypsum as by-products, comprising the following steps:

(1) Phosphate rock powder and excess amount of phosphoric acid were added to the extraction tank, wherein the solid-liquid mass ratio of the phosphate rock powder to the phosphoric acid was 1:25 and the concentration of phosphate acid was 30 wt %. The extraction reaction was carried out under the condition of continuous stirring. After the completion of the extraction, sulfuric acid solution with a concentration of 26 wt % was added. The addition amount of sulfuric acid was controlled and the reaction was carried out continuously to obtain an extraction slurry. About 50% of the calcium ions were transformed into dihydrate gypsum and the other 50% of calcium ions existed in the extraction slurry in a form of calcium dihydrogen phosphate. Thereafter, solid and liquid phases of the extraction slurry were separated by passing the extraction slurry through a filter to obtain a phosphoric acid extraction solution A and a slag slurry B. Therein, phosphoric acid in the phosphoric acid extraction solution was 3.0 mol/L and the calcium ion concentration was 0.8 mol/L.

(2) The phosphate acid extraction solution A obtained in the step (1) was introduced into the decalcification reaction tank. Sulfuric acid solution with a concentration of 26 wt %, which was diluted with phosphoric acid of 30 wt %, was added to the decalcification reaction tank. The temperature was maintained at 90° C. and the reaction was carried out for 2 h with stirring. The resulting gypsum whiskers suspended in the phosphoric acid. Solid and liquid of the gypsum whisker suspension was separated by filter to obtain a solid C and a filtrate D. The filtrate D was divided into four parts: one part was introduced into the crystal transformation tank I for crystal transformation reaction, another part was introduced into the crystal transformation tank II for crystal transformation reaction, another part was introduced into the extraction tank for phosphoric rock extraction and the other part was transferred to acid pool as the phosphoric acid product.

(3) The solid C was transferred to the crystal transformation tank I, part of the filtrate D and part of the sulfuric acid solution in the sulfuric acid diluting tank were added, and the liquid-solid mass ratio in the crystal transformation tank I was controlled to be 3:1. The crystal transformation tank I contained a mixed acid comprising sulfuric acid and phosphoric acid, wherein the mass percentage of sulfuric acid counted by $H_2SO_4$ was 11% of the mixed acid and the mass percentage of phosphoric acid counted by $P_2O_5$ was 18% of the mixed acid. According to mass percentage of the crystal transformation system, the following crystal transformation agents were added: sodium citrate 0.14%, ferric sulfate 0.25%. Crystal transformation reaction was carried out for 3 h at a temperature maintained at 110° C. After the completion of the reaction, the solid and the liquid were separated by filter to obtain a solid E and a filtrate F. The obtained filtrate F was introduced into the crystal transformation tank I and subjected to crystal transformation reaction continuously. The solid E obtained was washed by 80 to 100° C. hot water to obtain a solid G and a washing liquid H. The solid G not only can be made into high-purity and high-whiteness alpha-hemihydrate gypsum after drying, but also can be made into high-quality gypsum products, such as gypsum board, gypsum block, gypsum components and so on, by adding water directly without drying. The washing liquid H was introduced into the sulfuric acid diluting tank to dilute concentrated sulfuric acid. One part of the diluted sulfuric acid solution was introduced into the extraction tank for continuing the extraction of phosphate rock, another part was introduced into the decalcification reaction tank for continuing the decalcification reaction, another part was introduced into the crystal transformation tank I for crystal transformation reaction, and the other part was introduced into the crystal transformation tank II for crystal transformation reaction. The vapor generated during dilution process provided heat for the crystal transformation tank I and the crystal transformation tank II.

(4) The slag slurry B obtained in the step (1) was transferred to the crystal transformation tank II, and part of the filtrate D, part of the filtrate J and part of the sulfuric acid solution in the sulfuric acid diluting tank were introduced. The liquid-solid mass ratio in the crystal transformation tank II was controlled to be 3:1. The crystal transformation tank II contained a mixed acid comprising sulfuric acid and phosphoric acid, wherein the mass percentage of sulfuric acid counted by $H_2SO_4$ was 10% of the mixed acid and the mass percentage of phosphoric acid counted by $P_2O_5$ was 18% of the mixed acid. According to mass percentage of the crystal transformation system, the following crystal transformation agents were added: sodium citrate 0.19%, ferric sulfate 0.30%. Crystal transformation reaction was carried out for 3 h at a temperature maintained at 110° C. After the reaction, the solid and the liquid were separated by belt filter to obtain a solid I and a filtrate J. One part of the filtrate J was introduced into the extraction tank for continuing extraction of the phosphate rock powder, and another part was introduced into the crystal transformation tank II for continuing the crystal transformation reaction. The solid I was washed with hot water to obtain a solid K and a washing liquid L. The solid K not only can be made into normal alpha-hemihydrate gypsum after drying by a drying machine, but also can be made into gypsum products, such as gypsum board, gypsum block, gypsum component and so on, by adding water directly without drying process. The washing liquid L was introduced into the sulfuric acid diluting tank for diluting the concentrated sulfuric acid.

Implementation Results:

Quimociac gravimetric method was used to test the phosphoric acid liquid product and the concentration was 29% wt; $P_2O_5$ content of the normal alpha-hemihydrate gypsum product was 0.05% wt; $P_2O_5$ content of the high-purity and high-whiteness alpha-hemihydrate gypsum product was 0.06% wt.

The normal alpha-hemihydrate gypsum products conformed to the industrial standard JC/T 2038-2010. Under optical microscope of 200× magnification, the alpha-hemihydrate gypsum showed a short hexagonal cylindrical shape, with an aspect ratio of 2 to 3. The alpha-hemihydrate gypsum has a 2 h bending strength of 7.0 MPa, a dry bending strength of 13 MPa, a dry compressive strength of 91 MPa, an initial setting time of 9 min and a final setting time of 19 min. The mass percentage of the alpha-hemihydrate gypsum was 88%.

The high-purity and high-whiteness alpha-hemihydrate gypsum products conformed to the industrial standard JC/T 2038-2010. Under optical microscope of 200× magnification, the alpha-hemihydrate gypsum showed a short hexagonal cylindrical shape, with an aspect ratio of 2 to 3. The high-purity and high-whiteness alpha-hemihydrate gypsum showed a 2 h bending strength of 8.0 MPa, a dry bending strength of 14 MPa, a dry compressive strength of 90 MPa, an initial setting time of 9 min and a final setting time of 20 min, a whiteness value of 96.6. The mass percentage of the alpha-hemihydrate gypsum was 99.99%.

Example 3

Raw material 1: phosphate rock, collection site: Guizhou Province;

Raw material 2: ferric sulfate, commercially available;

Raw material 3: sodium dodecyl sulfonate, commercially available;

Raw material 4: sulfuric acid, concentration is 97 wt %, commercially available;

All of the sulfuric acid solutions used in the example were obtained by diluting the concentrated sulfuric acid of 97 wt % in sulfuric acid diluting tank.

A method for producing by-products of wet-process phosphoric acid, alpha-hemihydrate gypsum as well as high-purity and high-whiteness alpha-hemihydrate gypsum as by-products, comprising the following steps:

(1) Phosphate rock powder and excess amount of phosphoric acid were added to the extraction tank, wherein the solid-liquid mass ratio of the phosphate rock powder to the phosphoric acid was 1:30 and the concentration of phosphate acid was 28 wt %. The extraction reaction was carried out under the condition of continuous stirring. After the completion of the extraction, sulfuric acid solution with a concentration of 25 wt % was added. The addition amount of sulfuric acid was controlled and the reaction was carried out continuously to obtain an extraction slurry. About 60% of the calcium ions were transformed into dihydrate gypsum and the other 40% of calcium ions existed in the extraction slurry in a form of calcium dihydrogen phosphate. Thereafter, solid and liquid phases of the extraction slurry were separated by passing the extraction slurry through a filter to obtain a phosphoric acid extraction solution A and a slag slurry B. Therein, phosphoric acid in the phosphoric acid extraction solution was 2.7 mol/L and the calcium ion concentration was 0.7 mol/L.

(2) The phosphate acid extraction solution A obtained in the step (1) was introduced into the decalcification reaction tank. Sulfuric acid solution with a concentration of 25 wt %, which was diluted with phosphoric acid of 28 wt %, was added to the decalcification reaction tank. The temperature was maintained at 95° C. and the reaction was carried out for 2.5 h with stirring. The resulting gypsum whiskers suspended in the phosphoric acid. Solid and liquid of the gypsum whisker suspension was separated by filter to obtain a solid C and a filtrate D. The filtrate D was divided into four parts: one part was introduced into the crystal transformation tank I for crystal transformation reaction, another part was introduced into the crystal transformation tank II for crystal transformation reaction, another part was introduced into the extraction tank for phosphoric rock extraction and the other part was transferred to acid pool as the phosphoric acid product.

(3) The solid C was transferred to the crystal transformation tank I, part of the filtrate D and part of the sulfuric acid solution in the sulfuric acid diluting tank were added, and the liquid-solid mass ratio in the crystal transformation tank I was controlled to be 4:1. The crystal transformation tank I contained a mixed acid comprising sulfuric acid and phosphoric acid, wherein the mass percentage of sulfuric acid counted by $H_2SO_4$ was 12% of the mixed acid and the mass percentage of phosphoric acid counted by $P_2O_5$ was 19% of the mixed acid. According to mass percentage of the crystal transformation system, the following crystal transformation agents were added: ferric sulfate 0.25%, sodium dodecyl sulfate 0.05%. Crystal transformation reaction was carried out for 4 h at a temperature maintained at 100° C. After the completion of the reaction, the solid and the liquid were separated by filter to obtain a solid E and a filtrate F. The obtained filtrate F was introduced into the crystal transformation tank I and subjected to crystal transformation reaction continuously. The solid E obtained was washed by 80 to 100° C. hot water to obtain a solid G and a washing liquid H. The solid G not only can be made into high-purity and high-whiteness alpha-hemihydrate gypsum after drying, but also can be made into high-quality gypsum products, such as gypsum board, gypsum block, gypsum components and so on, by adding water directly without drying. The washing liquid H was introduced into the sulfuric acid diluting tank to dilute concentrated sulfuric acid. One part of the diluted sulfuric acid solution was introduced into the extraction tank for continuing the extraction of phosphate rock, another part was introduced into the decalcification reaction tank for continuing the decalcification reaction, another part was introduced into the crystal transformation tank I for crystal transformation reaction, and the other part was introduced into the crystal transformation tank II for crystal transformation reaction. The vapor generated during dilution process provided heat for the crystal transformation tank I and the crystal transformation tank II.

(4) The slag slurry B obtained in the step (1) was transferred to the crystal transformation tank II, and part of the filtrate D, part of the filtrate J and part of the sulfuric acid solution in the sulfuric acid diluting tank were introduced. The liquid-solid mass ratio in the crystal transformation tank II was controlled to be 4:1. The crystal transformation tank II contained a mixed acid comprising sulfuric acid and phosphoric acid, wherein the mass percentage of sulfuric acid counted by $H_2SO_4$ was 12% of the mixed acid and the mass percentage of phosphoric acid counted by $P_2O_5$ was 19% of the mixed acid. According to mass percentage of the crystal transformation system, the following crystal transformation agents were added: ferric sulfate 0.25%, sodium dodecyl sulfate 0.05%. Crystal transformation reaction was carried out for 4 h at a temperature maintained at 100° C. After the reaction, the solid and the liquid were separated by a filter to obtain a solid I and a filtrate J. One part of the filtrate J was introduced into the extraction tank for continuing extraction of the phosphate rock powder, and another part was introduced into the crystal transformation tank II for continuing the crystal transformation reaction. The solid I was washed with hot water to obtain a solid K and a washing liquid L. The solid K not only can be made into normal alpha-hemihydrate gypsum after drying by a drying machine, but also can be made into gypsum products, such as gypsum board, gypsum block, gypsum component and so on, by adding water directly without drying process. The washing liquid L was introduced into the sulfuric acid diluting tank for diluting the concentrated sulfuric acid.

Implementation Results:

Quimociac gravimetric method was used to test the phosphoric acid liquid product and the concentration was 26% wt; $P_2O_5$ content of the normal alpha-hemihydrate gypsum product was 0.06% wt; $P_2O_5$ content of the high-purity and high-whiteness alpha-hemihydrate gypsum product was 0.04% wt.

The normal alpha-hemihydrate gypsum products conformed to the industrial standard JC/T 2038-2010. Under optical microscope of 200× magnification, the alpha-hemihydrate gypsum showed a short hexagonal cylindrical shape, with an aspect ratio of 3 to 4. The alpha-hemihydrate gypsum has a 2 h bending strength of 8.0 MPa, a dry bending strength of 17 MPa, a dry compressive strength of 89 MPa, an initial setting time of 12 min and a final setting time of 15 min. The mass percentage of the alpha-hemihydrate gypsum was 87%.

The high-purity and high-whiteness alpha-hemihydrate gypsum products conformed to the industrial standard JC/T 2038-2010. Under optical microscope of 200× magnification, the alpha-hemihydrate gypsum showed a short hexagonal cylindrical shape, with an aspect ratio of 3 to 4. The high-purity and high-whiteness alpha-hemihydrate gypsum has a 2 h bending strength of 10.0 MPa, a dry bending strength of 20 MPa, a dry compressive strength of 91 MPa, an initial setting time of 10 min and a final setting time of 14 min, a whiteness value of 97.6. The mass percentage of the alpha-hemihydrate gypsum was 99.99%.

Example 4

Raw material 1: phosphate rock, collection site: Guizhou Province;

Raw material 2: magnesium nitrate, commercially available;

Raw material 3: ferric citrate, commercially available;

Raw material 4: sulfuric acid, concentration 97 wt %, commercially available;

All of the sulfuric acid solutions used in the example were obtained by diluting the concentrated sulfuric acid of 97 wt % in sulfuric acid diluting tank.

A method for producing by-products of wet-process phosphoric acid, alpha-hemihydrate gypsum as well as high-purity and high-whiteness alpha-hemihydrate gypsum as by-products, comprising the following steps:

(1) Phosphate rock powder and excess amount of phosphoric acid were added to the extraction tank, wherein the solid-liquid mass ratio of the phosphate rock powder to the phosphoric acid was 1:40 and the concentration of phosphate acid was 35 wt %. The extraction reaction was carried out under the condition of continuous stirring. After the completion of the extraction, sulfuric acid solution with a concentration of 27 wt % was added. The addition amount of sulfuric acid was controlled and the reaction was carried out continuously to obtain an extraction slurry. About 50% of the calcium ions were transformed into dihydrate gypsum and the other 50% of calcium ions existed in the extraction slurry in a form of calcium dihydrogen phosphate. Thereafter, solid and liquid phases of the extraction slurry were separated by passing the extraction slurry through a filter to obtain a phosphoric acid extraction solution A and a slag slurry B. Therein, phosphoric acid in the phosphoric acid extraction solution was 2.9 mol/L and the calcium ion concentration was 0.9 mol/L.

(2) The phosphate acid extraction solution A obtained in the step (1) was introduced into the decalcification reaction tank. Sulfuric acid solution with a concentration of 27 wt %, which was diluted with phosphoric acid of 35 wt %, was added to the decalcification reaction tank. The temperature was maintained at 90° C. and the reaction was carried out for 2 h with stirring. The resulting gypsum whiskers suspended in the phosphoric acid. Solid and liquid of the gypsum whisker suspension was separated by filter to obtain a solid C and a filtrate D. The filtrate D was divided into four parts: one part was introduced into the crystal transformation tank I for crystal transformation reaction, another part was introduced into the crystal transformation tank II for crystal transformation reaction, another part was introduced into the extraction tank for phosphoric rock extraction and the other part was transferred to acid pool as the phosphoric acid product.

(3) The solid C was transferred to the crystal transformation tank I, part of the filtrate D and part of the sulfuric acid solution in the sulfuric acid diluting tank were added, and the liquid-solid mass ratio in the crystal transformation tank I was controlled to be 5:1. The crystal transformation tank I contained a mixed acid comprising sulfuric acid and phosphoric acid, wherein the mass percentage of sulfuric acid counted by $H_2SO_4$ was 10% of the mixed acid and the mass percentage of phosphoric acid counted by $P_2O_5$ was 23% of the mixed acid. According to mass percentage of the crystal transformation system, the following crystal transformation agents were added: magnesium nitrate 0.10%, iron citrate 0.12%. Crystal transformation reaction was carried out for 3 h at a temperature maintained at 90° C. After the completion of the reaction, the solid and the liquid were separated by filter to obtain a solid E and a filtrate F. The obtained filtrate F was introduced into the crystal transformation tank I and subjected to crystal transformation reaction continuously. The solid E obtained was washed by 80 to 100° C. hot water to obtain a solid G and a washing liquid H. The solid G not only can be made into high-purity and high-whiteness alpha-hemihydrate gypsum after drying, but also can be made into high-quality gypsum products, such as gypsum board, gypsum block, gypsum components and so on, by adding water directly without drying. The washing liquid H was introduced into the sulfuric acid diluting tank to dilute concentrated sulfuric acid. One part of the diluted sulfuric acid solution was introduced into the extraction tank for continuing the extraction of phosphate rock, another part was introduced into the decalcification reaction tank for continuing the decalcification reaction, another part was introduced into the crystal transformation tank I for crystal transformation reaction, and the other part was introduced into the crystal transformation tank II for crystal transformation reaction. The vapor generated during dilution process provided heat for the crystal transformation tank I and the crystal transformation tank II.

(4) The slag slurry B obtained in the step (1) was transferred to the crystal transformation tank II, and part of the filtrate D, part of the filtrate J and part of the sulfuric acid solution in the sulfuric acid diluting tank were introduced. The liquid-solid mass ratio in the crystal transformation tank II was controlled to be 5:1. The crystal transformation tank II contained a mixed acid comprising sulfuric acid and phosphoric acid, wherein the mass percentage of sulfuric acid counted by $H_2SO_4$ was 10% of the mixed acid and the mass percentage of phosphoric acid counted by $P_2O_5$ was 23% of the mixed acid. According to mass percentage of the crystal transformation system, the following crystal transformation agents were added: magnesium nitrate 0.10%, iron citrate 0.12%. Crystal transformation reaction was carried out for 3 h at a temperature maintained at 90° C. After the reaction, the solid and the liquid were separated by a filter to obtain a solid I and a filtrate J. One part of the filtrate J was introduced into the extraction tank for continuing extraction of the phosphate rock powder, and another part was introduced into the crystal transformation tank II for continuing the crystal transformation reaction. The solid I was washed with hot water to obtain a solid K and a washing liquid L. The solid K not only can be made into normal alpha-hemihydrate gypsum after drying by a drying machine, but also can be made into gypsum products, such as gypsum board, gypsum block, gypsum component and so on, by adding water directly without drying process. The washing liquid L was introduced into the sulfuric acid diluting tank for diluting the concentrated sulfuric acid.

Implementation Results:

Quimociac gravimetric method was used to test the phosphoric acid liquid product and the concentration was 28% wt; $P_2O_5$ content of the normal alpha-hemihydrate gypsum product was 0.06% wt; $P_2O_5$ content of the high-purity and high-whiteness alpha-hemihydrate gypsum product was 0.05% wt.

The normal alpha-hemihydrate gypsum products conformed to the industrial standard JC/T 2038-2010. Under optical microscope of 200× magnification, the alpha-hemihydrate gypsum showed a short hexagonal cylindrical shape, with an aspect ratio of 2 to 3. The alpha-hemihydrate gypsum has a 2 h bending strength of 10.0 MPa, a dry bending strength of 20 MPa, a dry compressive strength of 91 MPa, an initial setting time of 10 min and a final setting time of 13 min. The mass percentage of the alpha-hemihydrate gypsum was 88%.

The high-purity and high-whiteness alpha-hemihydrate gypsum products conformed to the industrial standard JC/T 2038-2010. Under optical microscope of 200× magnification, the alpha-hemihydrate gypsum showed a short hexagonal cylindrical shape, with an aspect ratio of 2 to 3. The high-purity and high-whiteness alpha-hemihydrate gypsum has a 2 h bending strength of 11.0 MPa, a dry bending strength of 20 MPa, a dry compressive strength of 90 MPa, an initial setting time of 11 min and a final setting time of 14 min, a whiteness value of 95.6. The mass percentage of the alpha-hemihydrate gypsum was 99.99%.

Example 5

Raw material 1: phosphate rock, collection site: Guizhou Kailin;

Raw material 2: ferric nitrate, commercially available;

Raw material 3: sodium citrate, commercially available;

Raw material 4: sulfuric acid, concentration 97 wt %, commercially available;

All of the sulfuric acid solutions used in the example were obtained by diluting the concentrated sulfuric acid of 97 wt % in sulfuric acid diluting tank.

A method for producing by-products of wet-process phosphoric acid, alpha-hemihydrate gypsum as well as high-purity and high-whiteness alpha-hemihydrate gypsum as by-products, comprising the following steps:

(1) Phosphate rock powder and excess amount of phosphoric acid were added to the extraction tank, wherein the solid-liquid mass ratio of the phosphate rock powder to the phosphoric acid was 1:45 and the concentration of phosphate acid was 20 wt %. The extraction reaction was carried out under the condition of continuous stirring. After the completion of the extraction, sulfuric acid solution with a concentration of 27 wt % was added. The addition amount of sulfuric acid was controlled and the reaction was carried out continuously to obtain an extraction slurry. About 40% of the calcium ions were transformed into dihydrate gypsum and the other 60% of calcium ions existed in the extraction slurry in a form of calcium dihydrogen phosphate. Thereafter, solid and liquid phases of the extraction slurry were separated by passing the extraction slurry through a filter to obtain a phosphoric acid extraction solution A and a slag slurry B. Therein, phosphoric acid in the phosphoric acid extraction solution was 2.1 mol/L and the calcium ion concentration was 0.8 mol/L.

(2) The phosphate acid extraction solution A obtained in the step (1) was introduced into the decalcification reaction tank. Sulfuric acid solution with a concentration of 27 wt %, which was diluted with phosphoric acid of 20 wt %, was added to the decalcification reaction tank. The temperature was maintained at 80° C. and the reaction was carried out for 2 h with stirring. The resulting gypsum whiskers suspended in the phosphoric acid. Solid and liquid of the gypsum whisker suspension was separated by filter to obtain a solid C and a filtrate D. The filtrate D was divided into four parts: one part was introduced into the crystal transformation tank I for crystal transformation reaction, another part was introduced into the crystal transformation tank II for crystal transformation reaction, another part was introduced into the extraction tank for phosphoric rock extraction and the other part was transferred to acid pool as the phosphoric acid product.

(3) The solid C was transferred to the crystal transformation tank I, part of the filtrate D and part of the sulfuric acid solution in the sulfuric acid diluting tank were added, and the liquid-solid mass ratio in the crystal transformation tank I was controlled to be 6:1. The crystal transformation tank I contained a mixed acid comprising sulfuric acid and phosphoric acid, wherein the mass percentage of sulfuric acid counted by $H_2SO_4$ was 12% of the mixed acid and the mass percentage of phosphoric acid counted by $P_2O_5$ was 25% of the mixed acid. According to mass percentage of the crystal transformation system, the following crystal transformation agents were added: ferric nitrate 0.22%, sodium citrate 0.07%. Crystal transformation reaction was carried out for 3 h at a temperature maintained at 100° C. After the completion of the reaction, the solid and the liquid were separated by filter to obtain a solid E and a filtrate F. The obtained filtrate F was introduced into the crystal transformation tank I and subjected to crystal transformation reaction continuously. The solid E obtained was washed by 80 to 100° C. hot water to obtain a solid G and a washing liquid H. The solid G not only can be made into high-purity and high-whiteness alpha-hemihydrate gypsum after drying, but also can be made into high-quality gypsum products, such as gypsum board, gypsum block, gypsum components and so on, by adding water directly without drying. The washing liquid H was introduced into the sulfuric acid diluting tank to dilute concentrated sulfuric acid. One part of the diluted sulfuric acid solution was introduced into the extraction tank for continuing the extraction of phosphate rock, another part was introduced into the decalcification reaction tank for continuing the decalcification reaction, another part was introduced into the crystal transformation tank I for crystal transformation reaction, and the other part was introduced into the crystal transformation tank II for crystal transformation reaction. The vapor generated during dilution process provided heat for the crystal transformation tank I and the crystal transformation tank II.

(4) The slag slurry B obtained in the step (1) was transferred to the crystal transformation tank II, and part of the filtrate D, part of the filtrate J and part of the sulfuric acid solution in the sulfuric acid diluting tank were introduced. The liquid-solid mass ratio in the crystal transformation tank II was controlled to be 6:1. The crystal transformation tank II contained a mixed acid comprising sulfuric acid and phosphoric acid, wherein the mass percentage of sulfuric acid counted by $H_2SO_4$ was 12% of the mixed acid and the mass percentage of phosphoric acid counted by $P_2O_5$ was 25% of the mixed acid. According to mass percentage of the crystal transformation system, the following crystal transformation agents were added: ferric nitrate 0.22%, sodium citrate 0.07%. Crystal transformation reaction was carried out for 3 h at a temperature maintained at 100° C. After the reaction, the solid and the liquid were separated by a filter to obtain a solid I and a filtrate J. One part of the filtrate J was introduced into the extraction tank for continuing extraction of the phosphate rock powder, and another part was introduced into the crystal transformation tank II for continuing the crystal transformation reaction. The solid I was washed with hot water to obtain a solid K and a washing liquid L. The solid K not only can be made into normal alpha-hemihydrate gypsum after drying by a drying machine, but also can be made into gypsum products, such as gypsum board, gypsum block, gypsum component and so on, by adding water directly without drying process. The washing liquid L was introduced into the sulfuric acid diluting tank for diluting the concentrated sulfuric acid.

Implementation Results:

Quimociac gravimetric method was used to test the phosphoric acid liquid product and the concentration was 20% wt; $P_2O_5$ content of the normal alpha-hemihydrate gypsum product was 0.07% wt; $P_2O_5$ content of the high-purity and high-whiteness alpha-hemihydrate gypsum product was 0.06% wt.

The normal alpha-hemihydrate gypsum products conformed to the industrial standard JC/T 2038-2010. Under optical microscope of 200× magnification, the alpha-hemihydrate gypsum showed a short hexagonal cylindrical shape, with an aspect ratio of 4 to 5. The alpha-hemihydrate gypsum has a 2 h bending strength of 12.0 MPa, a dry bending strength of 20 MPa, a dry compressive strength of 89 MPa, an initial setting time of 13 min and a final setting time of 16 min. The mass percentage of the alpha-hemihydrate gypsum was 89%.

The high-purity and high-whiteness alpha-hemihydrate gypsum products conformed to the industrial standard JC/T 2038-2010. Under optical microscope of 200× magnification, the alpha-hemihydrate gypsum showed a short hexagonal cylindrical shape, with an aspect ratio of 4 to 5. The high-purity and high-whiteness alpha-hemihydrate gypsum has a 2 h bending strength of 12.0 MPa, a dry bending strength of 20 MPa, a dry compressive strength of 89 MPa, an initial setting time of 14 min and a final setting time of 18 min, a whiteness value of 95.8. The mass percentage of the alpha-hemihydrate gypsum was 99.98%.

Example 6

Raw material 1: phosphate rock, collection site: Guizhou Province;

Raw material 2: magnesium nitrate, commercially available;

Raw material 3: ferric citrate, commercially available;

Raw material 4: sulfuric acid, concentration 97 wt %, commercially available;

All of the sulfuric acid solutions used in the example were obtained by diluting the concentrated sulfuric acid of 97 wt % in sulfuric acid diluting tank.

A method for producing by-products of wet-process phosphoric acid, alpha-hemihydrate gypsum as well as high-purity and high-whiteness alpha-hemihydrate gypsum as by-products, comprising the following steps:

(1) Phosphate rock powder and excess amount of phosphoric acid were added to the extraction tank, wherein the solid-liquid mass ratio of the phosphate rock powder to the phosphoric acid was 1:40 and the concentration of phosphate acid was 35 wt %. The extraction reaction was carried out under the condition of continuous stirring. After the completion of the extraction, sulfuric acid solution with a concentration of 27 wt % was added. The addition amount of sulfuric acid was controlled and the reaction was carried out continuously to obtain an extraction slurry. About 50% of the calcium ions were transformed into dihydrate gypsum and the other 50% of calcium ions existed in the extraction slurry in a form of calcium dihydrogen phosphate. Thereafter, solid and liquid phases of the extraction slurry were separated by passing the extraction slurry through a filter to obtain a phosphoric acid extraction solution A and a slag slurry B. Therein, phosphoric acid in the phosphoric acid extraction solution was 2.9 mol/L and the calcium ion concentration was 0.9 mol/L.

(2) The phosphate acid extraction solution A obtained in the step (1) was introduced into the decalcification reaction tank. Sulfuric acid solution with a concentration of 27 wt %, which was diluted with phosphoric acid of 35 wt %, was added to the decalcification reaction tank. The temperature was maintained at 90° C. and the reaction was carried out for 2 h with stirring. The resulting gypsum whiskers suspended in the phosphoric acid. Solid and liquid of the gypsum whisker suspension was separated by filter to obtain a solid C and a filtrate D. The filtrate D was divided into four parts: one part was introduced into the crystal transformation tank I for crystal transformation reaction, another part was introduced into the crystal transformation tank II for crystal transformation reaction, another part was introduced into the extraction tank for phosphoric rock extraction and the other part was transferred to acid pool as the phosphoric acid product.

(3) The solid C was transferred to the crystal transformation tank I, part of the filtrate D and part of the sulfuric acid solution in the sulfuric acid diluting tank were added, and the liquid-solid mass ratio in the crystal transformation tank I was controlled to be 5:1. The crystal transformation tank I contained a mixed acid comprising sulfuric acid and phosphoric acid, wherein the mass percentage of sulfuric acid counted by $H_2SO_4$ was 10% of the mixed acid and the mass percentage of phosphoric acid counted by $P_2O_5$ was 23% of the mixed acid. According to mass percentage of the crystal transformation system, the following crystal transformation agents were added: magnesium nitrate 0.10%, iron citrate 0.12%. Crystal transformation reaction was carried out for 3 h at a temperature maintained at 90° C. After the completion of the reaction, the solid and the liquid were separated by filter to obtain a solid E and a filtrate F. The obtained filtrate F was introduced into the crystal transformation tank I and subjected to crystal transformation reaction continuously. The solid E obtained was washed by 80 to 100° C. hot water to obtain a solid G and a washing liquid H. The solid G not only can be made into high-purity and high-whiteness alpha-hemihydrate gypsum after drying, but also can be made into high-purity and high-whiteness dihydrate gypsum by drying naturally in the air. The high-purity and high-whiteness dihydrate gypsum can be calcined in a calcining furnace at 150° C. and ground to a particle size of 90-110 μm to obtain a high-purity and high-whiteness beta-gypsum powder. The washing liquid H was introduced into the sulfuric acid diluting tank to dilute concentrated sulfuric acid. One part of the diluted sulfuric acid solution was introduced into the extraction tank for continuing the extraction of phosphate rock, another part was introduced into the decalcification reaction tank for continuing the decalcification reaction, another part was introduced into the crystal transformation tank I for crystal transformation reaction, and the other part was introduced into the crystal transformation tank II for crystal transformation reaction. The vapor generated during dilution process provided heat for the crystal transformation tank I and the crystal transformation tank II.

(4) The slag slurry B obtained in the step (1) was transferred to the crystal transformation tank II, and part of the filtrate D, part of the filtrate J and part of the sulfuric acid solution in the sulfuric acid diluting tank were introduced. The liquid-solid mass ratio in the crystal transformation tank II was controlled to be 5:1. The crystal transformation tank II contained a mixed acid comprising sulfuric acid and phosphoric acid, wherein the mass percentage of sulfuric acid counted by $H_2SO_4$ was 10% of the mixed acid and the mass percentage of phosphoric acid counted by $P_2O_5$ was 23% of the mixed acid. According to mass percentage of the crystal transformation system, the following crystal transformation agents were added: magnesium nitrate 0.10%, iron citrate 0.12%. Crystal transformation reaction was carried out for 3 h at a temperature maintained at 90° C. After the reaction, the solid and the liquid were separated by a filter to obtain a solid I and a filtrate J. One part of the filtrate J was introduced into the extraction tank for continuing extraction of the phosphate rock powder, and another part was introduced into the crystal transformation tank II for continuing the crystal transformation reaction. The solid I was washed with hot water to obtain a solid K and a washing liquid L. The solid K not only can be made into normal alpha-hemihydrate gypsum after drying by a drying machine, but also can be made into gypsum products, such as gypsum board, gypsum block, gypsum component and so on, by adding water directly without drying process. The washing liquid L was introduced into the sulfuric acid diluting tank for diluting the concentrated sulfuric acid.

Implementation Results:

Quimociac gravimetric method was used to test the phosphoric acid liquid product and the concentration was 28% wt; $P_2O_5$ content of the normal alpha-hemihydrate gypsum product was 0.06% wt; $P_2O_5$ content of the high-purity and high-whiteness alpha-hemihydrate gypsum product was 0.05% wt.

The normal alpha-hemihydrate gypsum products conformed to the industrial standard JC/T 2038-2010. Under optical microscope of 200× magnification, the alpha-hemihydrate gypsum showed a short hexagonal cylindrical shape, with an aspect ratio of 2 to 3. The alpha-hemihydrate gypsum has a 2 h bending strength of 10.0 MPa, a dry bending strength of 20 MPa, a dry compressive strength of 91 MPa, an initial setting time of 10 min and a final setting time of 13 min. The mass percentage of the alpha-hemihydrate gypsum was 88%.

The high-purity and high-whiteness alpha-hemihydrate gypsum products conformed to the industrial standard JC/T 2038-2010. Under optical microscope of 200× magnification, the alpha-hemihydrate gypsum showed a short hexagonal cylindrical shape, with an aspect ratio of 2 to 3. The high-purity and high-whiteness alpha-hemihydrate gypsum has a 2 h bending strength of 11.0 MPa, a dry bending strength of 20 MPa, a dry compressive strength of 90 MPa, an initial setting time of 11 min and a final setting time of 14 min, a whiteness value of 95.6. The mass percentage of the alpha-hemihydrate gypsum was 99.99%.

The high-purity and high-whiteness beta-hemihydrate gypsum products conformed to the national standard "Building Gypsum Plaster" GB/T 9776-2008, which have an initial setting time of 7 min 20 sec and a final setting time of 1 min 15 sec, a 2 h wet bending strength of 3.3 MPa and a whiteness value of 95. The mass percentage of the beta-hemihydrate gypsum was higher than 99.9%.

The mass percentage of calcium sulfate in dihydrate gypsum product was higher than 99.8%, and the mass percentage of adhesive water was below 0.2%.

Example 7

Raw material 1: phosphate rock, collection site: Guizhou Kailin;
Raw material 2: ferric nitrate, commercially available;
Raw material 3: sodium citrate, commercially available;
Raw material 4: sulfuric acid, concentration 97 wt %, commercially available;

All of the sulfuric acid solutions used in the example were obtained by diluting the concentrated sulfuric acid of 97 wt % in sulfuric acid diluting tank.

A method for producing by-products of wet-process phosphoric acid, alpha-hemihydrate gypsum as well as high-purity and high-whiteness alpha-hemihydrate gypsum as by-products, comprising the following steps:

(1) Phosphate rock powder and excess amount of phosphoric acid were added to the extraction tank, wherein the solid-liquid mass ratio of the phosphate rock powder to the phosphoric acid was 1:45 and the concentration of phosphate acid was 20 wt %. The extraction reaction was carried out under the condition of continuous stirring. After the completion of the extraction, sulfuric acid solution with a concentration of 27 wt % was added. The addition amount of sulfuric acid was controlled and the reaction was carried out continuously to obtain an extraction slurry. About 40% of the calcium ions were transformed into dihydrate gypsum and the other 60% of calcium ions existed in the extraction slurry in a form of calcium dihydrogen phosphate. Thereafter, solid and liquid phases of the extraction slurry were separated by passing the extraction slurry through a filter to obtain a phosphoric acid extraction solution A and a slag slurry B. Therein, phosphoric acid in the phosphoric acid extraction solution was 2.1 mol/L and the calcium ion concentration was 0.8 mol/L.

(2) The phosphate acid extraction solution A obtained in the step (1) was introduced into the decalcification reaction tank. Sulfuric acid solution with a concentration of 27 wt %, which was diluted with phosphoric acid of 20 wt %, was added to the decalcification reaction tank. The temperature was maintained at 80° C. and the reaction was carried out for 2 h with stirring. The resulting gypsum whiskers suspended in the phosphoric acid. Solid and liquid of the gypsum whisker suspension was separated by filter to obtain a solid C and a filtrate D. The filtrate D was divided into four parts: one part was introduced into the crystal transformation tank I for crystal transformation reaction, another part was introduced into the crystal transformation tank II for crystal transformation reaction, another part was introduced into the extraction tank for phosphoric rock extraction and the other part was transferred to acid pool as the phosphoric acid product.

(3) The solid C was transferred to the crystal transformation tank I, part of the filtrate D and part of the sulfuric acid solution in the sulfuric acid diluting tank were added, and the liquid-solid mass ratio in the crystal transformation tank I was controlled to be 6:1. The crystal transformation tank I contained a mixed acid comprising sulfuric acid and phosphoric acid, wherein the mass percentage of sulfuric acid counted by $H_2SO_4$ was 12% of the mixed acid and the mass percentage of phosphoric acid counted by $P_2O_5$ was 25% of the mixed acid. According to mass percentage of the crystal transformation system, the following crystal transformation agents were added: ferric nitrate 0.22%, sodium citrate 0.07%. Crystal transformation reaction was carried out for 3 h at a temperature maintained at 100° C. After the completion of the reaction, the solid and the liquid were separated by filter to obtain a solid E and a filtrate F. The obtained filtrate F was introduced into the crystal transformation tank I and subjected to crystal transformation reaction continuously. The solid E obtained was washed by 80 to 100° C. hot water to obtain a solid G and a washing liquid H. The solid G not only can be made into high-purity and high-whiteness alpha-hemihydrate gypsum after drying, but also can be made into high-purity and high-whiteness dihydrate gypsum by drying naturally in the air. The high-purity and high-whiteness dihydrate gypsum can be calcined in a calcining furnace at 170° C. and ground to a particle size of 75-90 μm to obtain a high-purity and high-whiteness beta-gypsum powder. The washing liquid H was introduced into the sulfuric acid diluting tank to dilute concentrated sulfuric acid. One part of the diluted sulfuric acid solution was introduced into the extraction tank for continuing the extraction of phosphate rock, another part was introduced into the decalcification reaction tank for continuing the decalcification reaction, another part was introduced into the crystal transformation tank I for crystal transformation reaction, and the other part was introduced into the crystal transformation tank II for crystal transformation reaction. The vapor generated during dilution process provided heat for the crystal transformation tank I and the crystal transformation tank II.

(4) The slag slurry B obtained in the step (1) was transferred to the crystal transformation tank II, and part of the filtrate D, part of the filtrate J and part of the sulfuric acid solution in the sulfuric acid diluting tank were introduced. The liquid-solid mass ratio in the crystal transformation tank II was controlled to be 6:1. The crystal transformation tank II contained a mixed acid comprising sulfuric acid and phosphoric acid, wherein the mass percentage of sulfuric acid counted by $H_2SO_4$ was 12% of the mixed acid and the mass percentage of phosphoric acid counted by $P_2O_5$ was 25% of the mixed acid. According to mass percentage of the crystal transformation system, the following crystal transformation agents were added: ferric nitrate 0.22%, sodium citrate 0.07%. Crystal transformation reaction was carried out for 3 h at a temperature maintained at 100° C. After the reaction, the solid and the liquid were separated by a filter to obtain a solid I and a filtrate J. One part of the filtrate J was introduced into the extraction tank for continuing extraction of the phosphate rock powder, and another part was introduced into the crystal transformation tank II for continuing the crystal transformation reaction. The solid I was washed with hot water to obtain a solid K and a washing liquid L. The solid K not only can be made into normal alpha-hemihydrate gypsum after drying by a drying machine, but also can be made into gypsum products, such as gypsum board, gypsum block, gypsum component and so on, by adding water directly without drying process. The washing liquid L was introduced into the sulfuric acid diluting tank for diluting the concentrated sulfuric acid.

Implementation Results:

Quimociac gravimetric method was used to test the phosphoric acid liquid product and the concentration was 20% wt; $P_2O_5$ content of the normal alpha-hemihydrate gypsum product was 0.07% wt; $P_2O_5$ content of the high-purity and high-whiteness alpha-hemihydrate gypsum product was 0.06% wt.

The normal alpha-hemihydrate gypsum products conformed to the industrial standard JC/T 2038-2010. Under optical microscope of 200× magnification, the alpha-hemihydrate gypsum showed a short hexagonal cylindrical shape, with an aspect ratio of 4 to 5. The alpha-hemihydrate gypsum has a 2 h bending strength of 12.0 MPa, a dry bending strength of 20 MPa, a dry compressive strength of 89 MPa, an initial setting time of 13 min and a final setting time of 16 min. The mass percentage of the alpha-hemihydrate gypsum was 89%.

The high-purity and high-whiteness alpha-hemihydrate gypsum products conformed to the industrial standard JC/T 2038-2010. Under optical microscope of 200× magnification, the alpha-hemihydrate gypsum showed a short hexagonal cylindrical shape, with an aspect ratio of 4 to 5. The high-purity and high-whiteness alpha-hemihydrate gypsum has a 2 h bending strength of 12.0 MPa, a dry bending strength of 20 MPa, a dry compressive strength of 89 MPa, an initial setting time of 14 min and a final setting time of 18 min, a whiteness value of 95.8. The mass percentage of the alpha-hemihydrate gypsum was 99.98%.

The high-purity and high-whiteness beta-hemihydrate gypsum products conformed to the national standard "Building Gypsum Plaster" GB/T 9776-2008, which have an initial setting time of 6 min 50 sec and a final setting time of 10 min 30 sec, a 2 h wet bending strength of 3.2 MPa and a whiteness value of 95.2. The mass percentage of the beta-hemihydrate gypsum was higher than 99.9%.

What is claimed is:

1. A method for producing wet-process phosphoric acid and at the same time obtaining an alpha-hemihydrate gypsum I as well as an alpha-hemihydrate gypsum II as by-products, comprising the following steps:
   (1) mixing phosphoric acid and phosphate rock powder, performing an extraction reaction under stirring; after completion of the extraction reaction, adding sulfuric acid solution, continuing the reaction under stirring to obtain an extraction slurry; separating solid and liquid of the extraction slurry to obtain a phosphoric acid extraction solution A and a slag slurry B; wherein the amount of the sulfuric acid solution added is controlled, so that 10% to 50% of calcium ions are transformed into dihydrate gypsum and the other 50% to 90% of calcium ions exist in a form of calcium dihydrogen phosphate;
   (2) mixing the phosphoric acid extraction solution A obtained in step (1) and the sulfuric acid solution, performing a decalcification reaction; after completion of the reaction, separating solid and liquid to obtain a solid C and a filtrate D;
   (3) performing a crystal transformation reaction with the solid C obtained in step (2), part of the filtrate D obtained in step (2), a sulfuric acid solution and a crystal transformation agent; after completion of the reaction, separating solid and liquid to obtain the alpha-hemihydrate gypsum II as well as a filtrate F;
   (4) performing crystal transformation reaction with the slag slurry B obtained in step (1), part of the filtrate D obtained in step (2), a sulfuric acid solution and a crystal transformation agent; after completion of the reaction, separating solid and liquid to obtain the alpha-hemihydrate gypsum I and a filtrate J,
   wherein a purity of the alpha-hemihydrate gypsum II is higher than that of the alpha-hemihydrate gypsum I.

2. The method according to claim 1, comprising the following steps:
   (1) mixing phosphoric acid and phosphate rock powder, performing an extraction reaction under stirring; after completion of the extraction reaction, adding sulfuric acid solution, continuing the reaction under stirring to obtain an extraction slurry; separating solid and liquid of the extraction slurry to obtain a phosphoric acid extraction solution A and a slag slurry B; wherein the amount of the sulfuric acid solution added is controlled, so that 30% to 50% of calcium ions are transformed into dihydrate gypsum and the other 50% to 70% of calcium ions exist in a form of calcium dihydrogen phosphate;
   (2) mixing the phosphoric acid extraction solution A obtained in step (1) and the sulfuric acid solution, performing a decalcification reaction; after completion of the reaction, separating solid and liquid to obtain a solid C and a filtrate D;
   (3) performing a crystal transformation reaction with the solid C obtained in step (2), part of the filtrate D obtained in step (2), a sulfuric acid solution and a crystal transformation agent; after completion of the reaction, separating solid and liquid to obtain the alpha-hemihydrate gypsum II as well as a filtrate F;
   (4) performing crystal transformation reaction with the slag slurry B obtained in step (1), part of the filtrate D obtained in step (2), a sulfuric acid solution and a crystal transformation agent; after completion of the reaction, separating solid and liquid to obtain the alpha-hemihydrate gypsum I and a filtrate J.

3. The method according to claim 2, comprising the following steps:
   (1) mixing phosphoric acid and phosphate rock powder, performing an extraction reaction under stirring; after completion of the extraction reaction, adding sulfuric acid solution, wherein the amount of the sulfuric acid solution added is controlled, so that 30% to 50% of calcium ions are transformed into dihydrate gypsum and the other 50% to 70% of calcium ions exist in a form of calcium dihydrogen phosphate; continuing the reaction under stirring to obtain an extraction slurry; separating solid and liquid of the extraction slurry to obtain a phosphoric acid extraction solution A and a slag slurry B;
   (2) mixing the phosphoric acid extraction solution A obtained in step (1) and the sulfuric acid solution, performing a decalcification reaction; after completion of the reaction, separating solid and liquid to obtain a solid C and a filtrate D; dividing the filtrate D into four parts, which are used for the extraction reaction of step (1), the crystal transformation reaction of step (3), the crystal transformation reaction of step (4), and used as phosphoric acid final product, respectively;
   (3) performing crystal transformation reaction with the solid C, the filtrate D obtained in step (2), a sulfuric acid solution and a crystal transformation agent; after completion of the reaction, separating solid and liquid to obtain a solid E and a filtrate F; mixing the obtained filtrate F and the solid C and performing a circular crystal transformation reaction; washing the solid E with 80 to 100° C. hot water to obtain a solid G and a washing liquid H; using the washing liquid H to dilute concentrated sulfuric acid to provide the sulfuric acid solution; drying the solid G to obtain the alpha-hemihydrate gypsum II;
   (4) performing crystal transformation reaction with the slag slurry B obtained in step (1), the filtrate D, a sulfuric acid solution and a crystal transformation agent; after completion of the reaction, separating solid and liquid to obtain a solid I and a filtrate J; dividing the filtrate J into two parts, which is used for the extraction reaction of step (1) and mixing with the slag slurry B for circular crystal transformation reaction, respectively; washing the solid I with 80 to 100° C. hot water to obtain a solid K and a washing liquid L which is used to dilute concentrated sulfuric acid to provide the sulfuric acid solution; drying the solid K to obtain the alpha-hemihydrate gypsum I.

4. The method according to claim 3, wherein in step (1), the fineness of the phosphate rock powder is from 80 to 100 meshes; the concentration of phosphoric acid counted by $H_3PO_4$ is from 20 to 35 wt %; and the solid-liquid mass ratio of the phosphate rock powder to the phosphoric acid is from 1:15 to 1:45.

5. The method according to claim 3, wherein in step (1), the reaction temperatures for the extraction reaction and the reaction after the addition of sulfuric acid solution are both from 50 to 80° C.; the extraction duration is from 1.5 to 4.5 h; after adding sulfuric acid solution, and reaction is continued under stirring for 1 to 2 h.

6. The method according to claim 3, wherein in step (1), the concentration of phosphoric acid in the phosphoric acid extraction solution A is from 2 to 3 mol/L and the concentration of calcium ion is from 0.5 to 1.0 mol/L.

7. The method according to claim 3, wherein in step (2), the temperature for decalcification reaction is from 60 to 130° C. and the reaction duration is from 1.5 to 7.5 h.

8. The method according to claim 3, wherein in step (2), the volume ratio of the sulfuric acid solution to the phosphoric acid extraction solution A is from 1:3 to 1:5.

9. The method according to claim 3, wherein in both step (3) and step (4), the liquid-solid mass ratio of crystal transformation reaction is (2 to 6):1; preferably, mixed acid comprising sulfuric acid and phosphoric acid is included in the crystal transformation system, wherein the mass percentage of sulfuric acid counted by $H_2SO_4$ in the mixed acid is from 8 to 12% and the mass percentage of phosphoric acid counted by $P_2O_5$ in the mixed acid is from 16 to 25%.

10. The method according to claim 3, wherein in both steps (3) and (4), the temperature for the crystal transformation reaction is from 60 to 130° C. and the reaction duration of the crystal transformation reaction is from 1.5 to 7.5 h.

11. The method according to claim 3, wherein in steps (3) and (4), the crystal transformation agent is selected from cation-containing water-soluble phosphate, cation-containing sulfate, cation-containing nitrate, cation-containing citrate, cation-containing alkylbenzenesulfonate, cation-containing alkyl fatty acid salt or a mixture thereof, and wherein the cation is selected from $Al^{3+}$, $Fe^{3+}$, $Mg^{2+}$, $K^+$, $Na^+$ and $NH_4^+$, or a mixture thereof.

12. The method according to claim 3, wherein in steps (3) and (4), the addition amount of the crystal transformation agent is from 0.1 to 1.0% of the mass of the crystal transformation system.

13. The method according to claim 3, comprising placing the solid G obtained in step (3) in the air and allowing water to be absorbed to give a dihydrate gypsum.

14. The method according to claim 3, comprising placing the solid G obtained in step (3) in the air and allowing water to be absorbed; performing calcination to give a beta-hemihydrate gypsum.

15. The method according to claim 14, wherein the temperature for calcination is from 140 to 180° C.

* * * * *